United States Patent
Fiehler et al.

[15] 3,645,012
[45] Feb. 29, 1972

[54] CARD FEEDER FOR INSTRUCTIONAL DEVICES

[72] Inventors: Raymond H. Fiehler, Kirkwood; John J. Dickman, Lemay; Max Diamant, University City, all of Mo.

[73] Assignee: Missouri Research Laboratories, Inc., St. Louis, Mo.

[22] Filed: Mar. 23, 1970

[21] Appl. No.: 21,804

Related U.S. Application Data

[63] Continuation-in-part of Ser. No. 699,485, Jan. 22, 1968, abandoned.

[52] U.S. Cl. ................................................35/9 R, 271/35
[51] Int. Cl. .........................................G09b 3/00, B65h 3/04
[58] Field of Search.................35/9 R; 271/34, 35; 40/78.07, 40/78.09

[56] References Cited

UNITED STATES PATENTS

| | | | |
|---|---|---|---|
| 3,350,793 | 11/1967 | Bushnell | 35/9 R |
| 120,309 | 10/1871 | Miller | 40/78.09 X |
| 651,307 | 6/1900 | Harris | 271/35 |
| 2,110,980 | 3/1938 | Swift, Jr. | 271/35 |
| 3,231,266 | 1/1966 | Yow-Jiun Hu | 271/35 |

Primary Examiner—Wm. H. Grieb
Attorney—Ralph W. Kalish

[57] ABSTRACT

A card feeder for instructional devices, such as teaching machines, wherein a card, the forward face of which, having inscribed question and multiple choice answers, is presented to the viewer and with the rearward face being suitably adapted for cooperating with a photoemissive source to effect requisite energization of indicators for signaling the correctness or incorrectness of the answer chosen; said feeder incorporating mutually contacting drive and driven belts for effecting separation of inadvertently mutually adhering cards moving therebetween for feeding of a single card into viewing position to assure accuracy in energizing the appropriate indicators; said drive belt having spaced-apart transversely extending ribs for defining recesses compatible with the size of the cards being accommodated.

1 Claim, 10 Drawing Figures

Patented Feb. 29, 1972
3,645,012
2 Sheets-Sheet 1
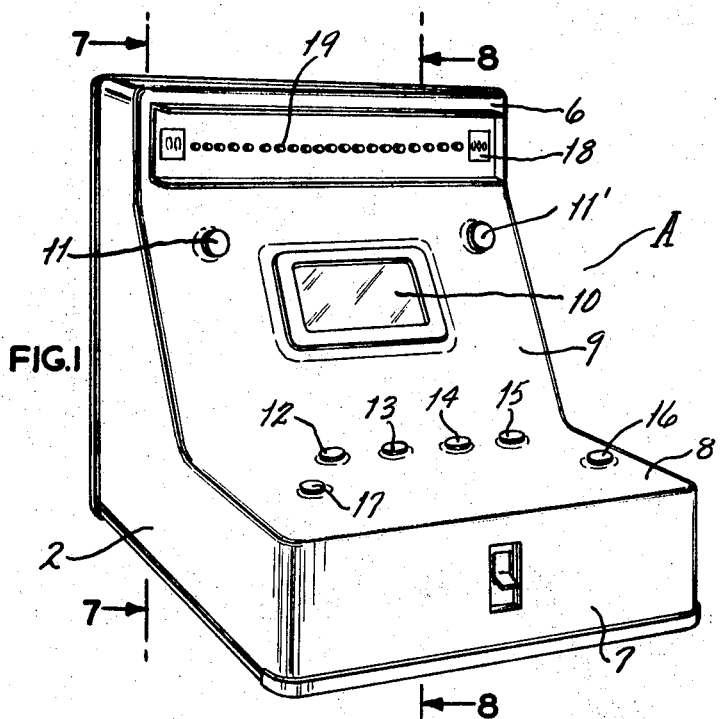
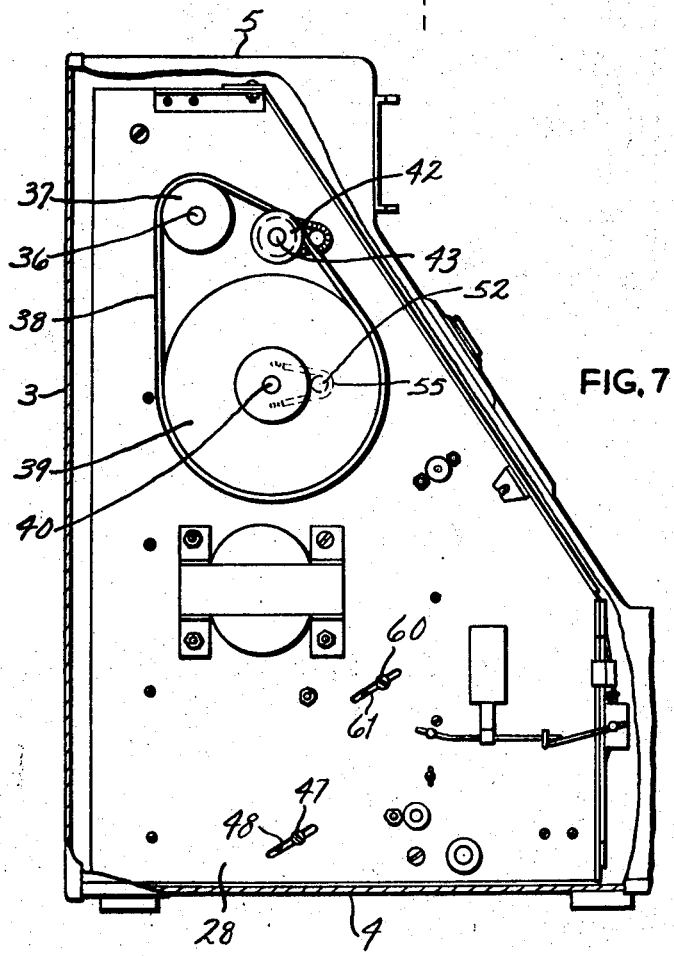
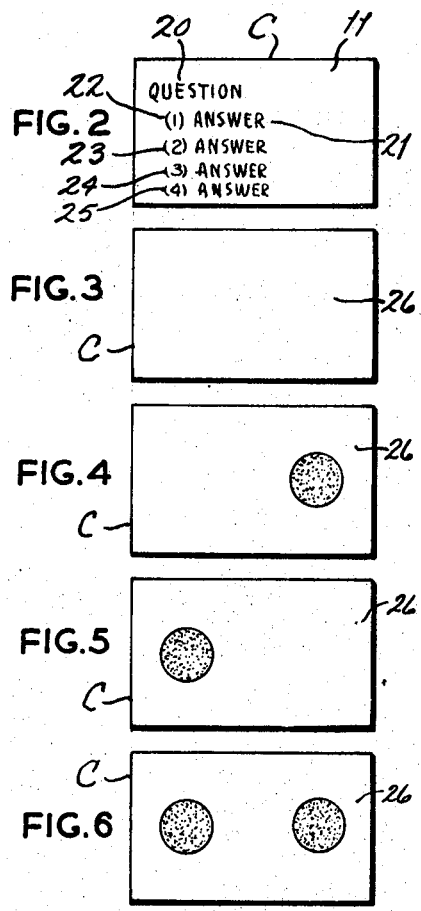
INVENTORS
RAYMOND H. FIEHLER
JOHN J. DICKMAN
MAX DIAMANT
BY Ralph N. Kalish
ATTORNEY Patented Feb. 29, 1972
3,645,012
2 Sheets-Sheet 2
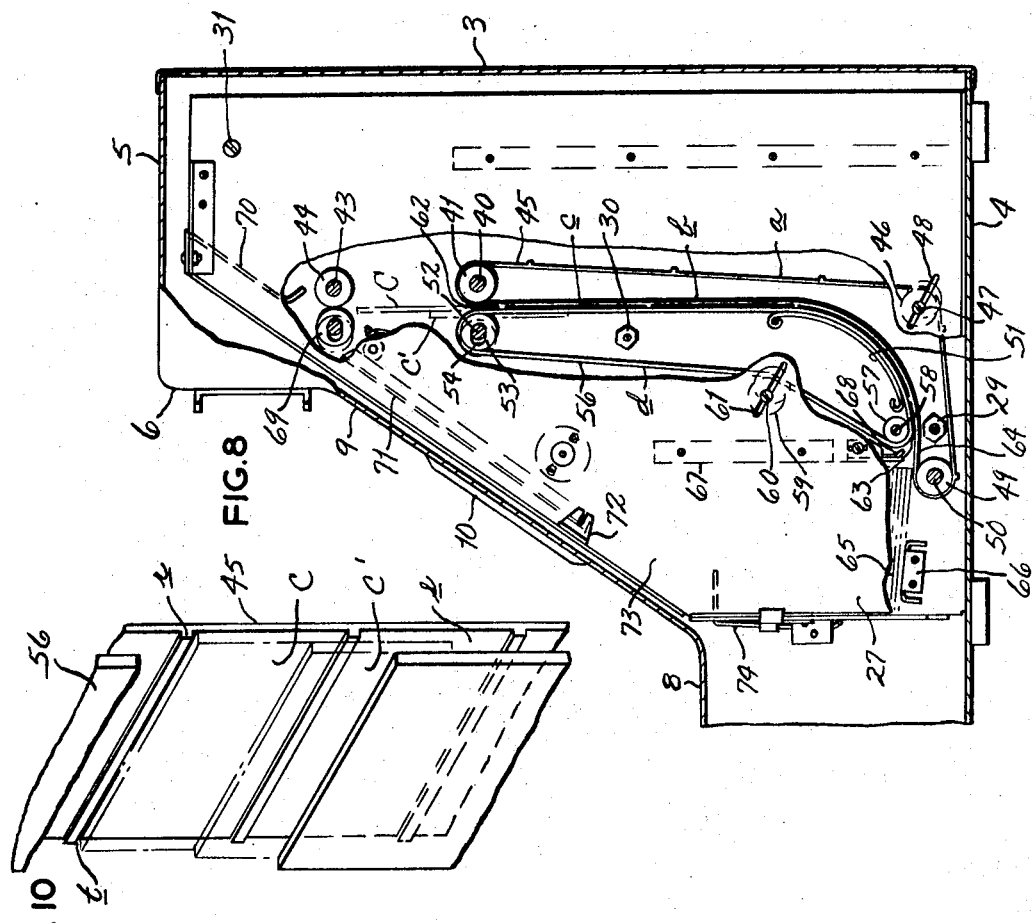
FIG. 8
FIG. 10
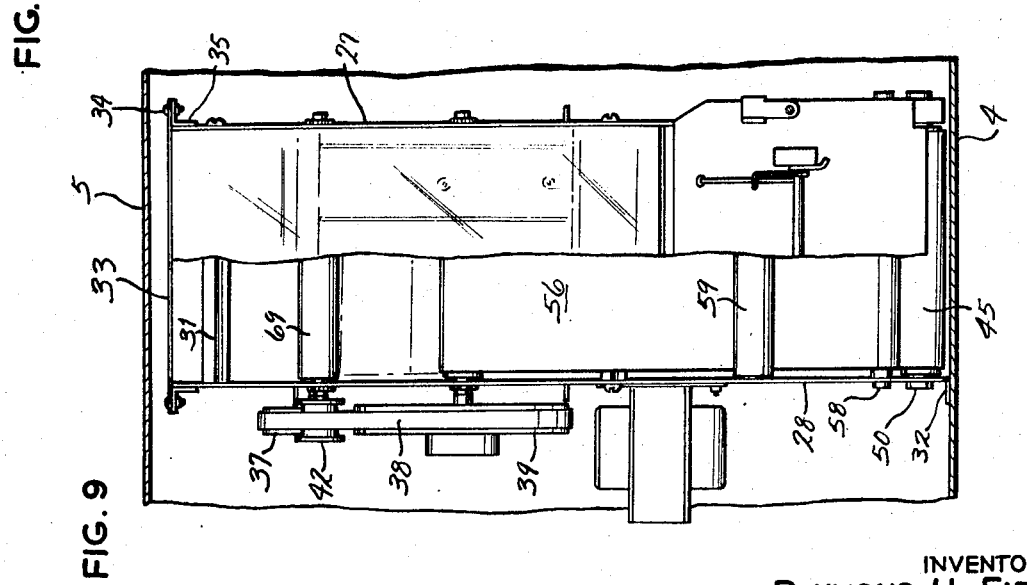
FIG. 9
INVENTORS
RAYMOND H. FIEHLER
JOHN J. DICKMAN
MAX DIAMANT
BY Ralph N. Kalish
ATTORNEY

CARD FEEDER FOR INSTRUCTIONAL DEVICES

BACKGROUND OF THE INVENTION

This application is a continuation-in-part of application Ser. No. 699,485 filed Jan. 22, 1968 now abandoned upon an invention entitled Card Feeder For Instructional Devices.

This invention relates in general to visual training and instructional machines and, more particularly, to a card feeder therefor adapted to effect presentation of a single card into viewing position for instructional accuracy.

Heretofore, there has developed a relatively widespread usage of teaching machines which utilize cards for instructional purposes with the same being sequentially presented to the viewer upon the latter's operation of the machine. Such cards carry on the face presented to the viewer a question and multiple choice answers. The rearward face is adapted to cooperate with a photoemissive source, such as photoelectric cell, for effecting closure of the circuit to the signal, such as a light, for indicating the correct answer. Should the viewer actuate a control button for a circuit other than the one for the "correct" signal, a visual, as by a lamp, or an audible signal will be operated to indicate the wrongness of the answer selected. Therefore, it is evident that for proper operation of the machine, there be no obstruction between the rearward face of the presented card and the photoemissive source so that the appropriate circuits will be closed. Quite often with card feeding systems currently used, cards tend to adhere to each other so that the forward face of one is presented to the machine user and the rearward face of the other is provided for coordination with the photoemissive source, whereupon the improper circuits will be closed and cause the viewer to obtain signals which do not indicate the true correctness or incorrectness of the answer chosen. Consequently, it has been a matter of serious concern with teaching machines utilizing cards that the mutual adherence of successive cards be prevented to assure that the machines at all times will not inadvertently cause erroneous instruction to the user.

SUMMARY OF THE INVENTION

It is an object of the present invention to provide a card feeder for use with instructional devices utilizing cards which will assure of the presentation of but a single card into viewing position so that the rearward face thereof will be properly positioned for circuit-making and breaking purposes.

It is another object of the present invention to provide an instructional device incorporating a card feeder comprising a marked simplicity of parts which coact in a novel manner for effectively separating any cards which may have become mutually adhered so that only one at a time is delivered for viewing.

It is a further object of the present invention to provide an instructional device incorporating a card feeder of the type stated which is reliable and durable in operation; which, by its novel construction, is resistant to breakdown; and the use of which assures of a consistent accuracy of operation of the answer-indicating signals so as to provide maximum teaching effectiveness.

BRIEF DESCRIPTION OF THE DRAWINGS

FIG. 1 is a perspective view of an instructional device incorporating a card feeder constructed in accordance with and embodying the present invention.

FIG. 2 is a front view of a typical card utilized by the training device.

FIG. 3 is a rear view of a card for circuit closure to indicate the correctness of the first answer.

FIG. 4 is a rear view of a card adapted for circuit closure to indicate the correctness of the second answer.

FIG. 5 is a rear view of a card adapted for circuit closure to indicate the correctness of the third answer.

FIG. 6 is a rear view of a card adapted for circuit closure to indicate the correctness of the fourth answer.

FIG. 7 is a vertical section taken on the line 7—7 of FIG. 1.

FIG. 8 is a vertical section taken on the line 8—8 of FIG. 1.

FIG. 9 is a front elevational view, partially broken away, illustrating the instructional device with the housing removed.

FIG. 10 is a fragmentary perspective view of the driving belt illustrating the separation of cards thereby.

DESCRIPTION OF THE PREFERRED EMBODIMENT

Referring now by reference characters to the drawings which illustrate the preferred embodiment of the present invention, A generally designates an instructional device such as a visual training machine or what is more commonly known as a "teaching machine" comprising a molded casing 1 having a pair of sidewalls 2, a backwall 3, a bottom wall 4, and a top wall 5 planar parallel to said bottom wall 4 but of relatively reduced depth. The front portion of said housing 1 comprises upper and lower vertical, transversely extending portions 6,7, there being a horizontal portion 8 at the upper end of said lower vertical portion 7 with a forwardly and downwardly inclined portion 9 continuous in its upper limit with upper vertical portion 6 and in its lower end with said horizontal portion 8. Said horizontal portion 8 constitutes a control panel while said inclined portion 9 constitutes a viewing and indicator panel. Centrally provided in said inclined portion 9 is a window 10 through which the user of the machine may view the forward face 11 of a card C, as will be described more fully hereinbelow. On opposite sides of said window 10 are indicator lights 11,11'. Horizontal portion 8 is provided with a multiplicity of answer selector push buttons 12,13,14,15 which correspond to the number of answers; there also being control buttons 16,17 for respectively controlling the change of cards C and the resetting of the machine A. Upper vertical portion 6 may be provided with suitable score and time elapse indicators, as indicated generally at 18,19, respectively.

Turning now to FIGS. 2, 3, 4, 5, and 6, it will be seen that the forward face 11 of each card C has inscribed thereon a question, as at 20, and multiple choice answers, indicated generally 21, which may be of any given number but herein are shown as being four in number, as at 22,23,24,25 which will thus correspond to answer selector buttons 12,13,14,14, respectively, so that if the user believes that the first answer, as at 22, is correct, he will depress button 12. The rear face 26 of each card C is suitably adapted for cooperating with a photoemissive source (not shown) provided within machine A for light impingement upon such rearward face 26 so as to cause the closure of the appropriate circuit if the user depresses the answer selector button which corresponds to the correct answer on card C. For purposes of example only, it will be seen that FIG. 3 illustrates the rearward face of a card C whereon the first answer, 22, is the correct one. FIG. 4 illustrates the rearward face of a card C where the correct answer is the second one, namely, as at 23. FIG. 5 shows the rearward face of a card C where the proper answer is the third one, as at 24; while FIG. 6 shows the rearward face of a card C where the right answer is the fourth one, as at 25. Should the user depress a selector button which does not correspond to the appropriate answer for the given card C, then the indicator light 11 will be illuminated indicating the incorrectness of the answer chosen. Should the user actuate the button corresponding to the correct answer, then by means of the pattern of the rearward face of the respective card cooperating with the photoemissive source, indicator lamp 11' will be illuminated and thus inform the user of the accuracy of his choice.

From the foregoing it is evident that each card C must be properly presented within machine A so as to assure of appropriate circuit closure upon actuation of the particular control button 12,13,14,15, as the case may be, so as to reliably indicate whether the answer picked was correct.

The means for assuring of proper presentation of each card C will now be described.

Provided within housing 1 is a pair of parallel, horizontally spaced mounting plates 27,28 which are presented spacedly inwardly of the adjacent sidewall 2 and are maintained in parallel relationship by means of a plurality of transversely extending spacers 29,30,31, suitably secured at their ends to said plates 27,28. Each of said plates 27,28 is fixed upon bottom wall 4 through means of a base flange 32 and at their upper ends are interconnected by a top plate 33, which latter is secured at its ends by screws 34 to mounting flanges 35 fixed to said plates 27,28 adjacent their upper margins. The forward edges of plates 27,28 in their upper portions are forwardly and downwardly inclined, as at 27′,28′, respectively, in parallel relationship to the plane of inclined portion 9 of housing 1. Provided adjacent the upper, outer portion of plate 28 is a prime mover (not shown) having a drive shaft, as indicated at 36, which projects toward plate 28 and mounts a gear 37 about which is trained an endless transmission belt 38 which progresses downwardly from gear 37 for disposition about a gear 39 of relatively increased diameter and which is carried on one end of a shaft 40 which is journaled in suitable bearings (not shown) provided in plates 27,28, for extension of said shaft 40 therebetween. Shaft 40 mounts a roller 41 for purposes presently appearing. From gear 39 said belt 38 continues upwardly for engaging a gear 42 mounted on the end of a shaft 43 which shaft is also journaled in bearings (not shown) formed in plates 27,28 for extension therebetween, said shaft 43 being substantially directly vertically upwardly of shaft 40. Between plates 27,28, shaft 43 mounts a roller 44.

Between plates 27,28 there is trained about roller 41 the upper portion of an endless conveyor belt 45, the rearward course of which, indicated at $a$, is led about a tensioning roller 46 mounted upon a shaft 47 which is journaled at its ends within narrow rearwardly and downwardly inclined slotlike bearings 48 to provide a floating arrangement so that said roller 46 will be biased through gravity into effecting a suitable tension upon said belt 45. Belt 45 is directed from roller 46 about guide roller 49 mounted upon a shaft 50 journaled in openings (not shown) in plates 27,28 proximate the lower edge of the said related plates and forwardly and slightly downwardly of roller 46. The course of belt 45 between rollers 41,49, being the forward course and indicated at $b$, is subjected to an arcuate or convex belt guide 51 located rearwardly of roller 49 and slightly thereabove thus causing the portion of belt 45 immediately above roller 49 to assume a substantially forwardly concave formation and being thence vertical thereabove.

Provided upon belt 45, throughout its extent, are longitudinally spaced apart, horizontally extending ribs $r$. The said ribs $r$ may be provided in any desirable manner such as, for example being integrally molded or formed with the body of belt 45, or if desired may be independently formed and affixed thereon by suitable securing means, as staples, adhesives, etc. The spacing between adjacent ribs $r$ which defines a recess $s$ is determined by the vertical dimension of the particular card C being accommodated so that such recess $s$ will be of slightly greater extent, providing a clearance as indicated to $t$. Additionally, ribs $r$ are relatively shallow being of most limited thickness, being preferably less than thickness of card C, although a thickness approximating that of said card C may be utilized.

Presented immediately forwardly of roller 41 in axial parallel relationship thereto is an idler shaft 52, carrying a roller 53 of like character as roller 41; the ends of shaft 52 being received in bearings 54 of slightly greater width than the diameter of said shaft 52 so as to allow for requisite adjustment for purposes which will be evident hereinbelow. Engaged about one end portion of shaft 52 is a coil spring 55 being bent in generally U-shape formation and with its opposite ends affixed to the inner face of plate 28 above and below shaft 40 for urging shaft 52 toward shaft 40. Trained about roller 53 is the upper end of an endless idler or driven belt 56, the rearward course of which, as indicated at $c$, is in normal face to face engagement with the confronting course $b$ of driving belt 45, contacting the faces of ribs $r$. The rearward course $c$ extends between the latter and belt guide 51; there being a lower roller 57 suitably carried upon an idler shaft 58 extending between walls 27,28 slightly upwardly and rearwardly of roller 49 for disposition thereabout of the lower end of said belt 56. A tensioning roller 59 engages the forward course of belt 56, as indicated at $d$, between rollers 53 and 57 for maintaining a desired degree of tension; said roller 59 carrying pins 60 at its opposite ends which project through elongated inclined slots 61 in said plates 27,28 for providing the desired range of adjustability.

It will thus be seen that driving belt 45 is operated by means of the prime mover (not shown), while belt 56 is caused to travel with belt 45 through frictional engagement developed therebetween by the contact of their confronting courses $b$ and $c$. Said courses define a path of travel therebetween terminating at its upper end as at 62, between rollers 41,53, and at its lower end, as at 63, said latter constituting an entry aligned with roller 57 which is rearwardly of a short extent of belt 45 above and slightly rearwardly of roller 49, as indicated broadly at 64.

Provided between plates 27,28 in their forward lower portion is a card bin or receptacle, indicated at 65, the lower end of which incorporates a transverse support 66 which is forwardly and upwardly of roller 49 but being rearwardly and downwardly inclined so as to direct the lowermost card C in the reservoir for engagement on its under rearward edge portion upon section 64 on belt 45. The rearward portion of bin 65 is defined by a wall-forming member, designated 67, the lower end of which is provided with a card detent 68 terminating immediately above section 64 of belt 45 with the intervening distance substantially equivalent to the thickness of a card C. As may best be seen in FIG. 8, cards C are stacked one above the other in bin 65 with the rearward face presented downwardly. Upon operation of control button 16 by conventional circuitry and electromechanical components, the bottommost card C in bin 65 will be moved rearwardly beneath detent 68 for frictional engagement with belt 45 for carrying therealong between courses $b,c$, of said belts 45,56, respectively, for delivery through, and upwardly of, belt terminus 62.

As a card C is delivered to belts 45,56 at entry 63, the same will be caused through the friction differential between the belts 45 and 46 to move into the proximate recess $s$ whereby during vertical travel the cards C will be thus supported upon their lower transverse edge by a rib $r$ while simultaneously being snugly held between the belts 45,56. Thus, driving belt 45 is adapted to effect a positive type of transmission of card C from the bin 65 for delivery to viewing position.

Roller 44 is so spaced above roller 41 that the same will engage the upper rearward face portion of card C while the lower portion thereof is still supported by the related rib $r$ on belt 45 so that said roller 44 is conjunction with a juxtaposed idler roller 69 will cause the particular card C to be carried upwardly thereabove for disposition upon an inclined surface 70 from whence the now ejected card will slide forwardly and downwardly in a card chute 71 mounted between plates 27,28, the lower portion of which is aligned with viewing window 10 in housing 1 so that the forward face of card C will be presented to the viewer. Thereupon the latter will depress the chosen answer selector button 12, 13, 14 or 15, as the case may be, and thereby energize the particular circuits as developed through the coaction of the photoemissive source (not shown) within device A so as to cause either signal 11, or 11′, as appropriate, to be activated. Provided at the lower end of card chute 71 is a stop member 72 which, upon the next depression of card change control button 16, will permit the erstwhile viewed card C to descend into a card collecting zone, as indicated at 73, for deposit of each viewed card pending operation of control button 17 which will operate means, designated generally at 74, (not shown), not forming a part of this invention, to permit the cards to descend into card bin 65 for consequent viewing.

Should two adjacent cards in reservoir or bin 65 become mutually adhered, as by static electricity, dirt, etc., and the same be delivered to entry 63 for presentation to belts 45,56; the unique construction of the former will effectively and reliably conduce to the separation of such cards assuring the ultimate delivery of but a single card to the viewing position. As indicated above, the card C proximate course b of belt 45 will, through the friction differential effected by the contactive arrangement of ribs r between driving belt 45 and driven belt 56 be caused to be received within the immediately adjacent recess s. Such card, while being introduced into such recess s by ribs r is being subjected to the moving belt 45 which, as indicated, is driving. While under the influence of belt 45, particular card C will be blocked by the adhering card from contact with the driven belt 56 which latter will be operating upon the adhering card. Thereby since the coefficient of friction at the interface of the cards is less than that between the same and the related belt, a mutual shearing or splitting, as it were, is brought about to thereby separate the cards. As developed above, this separation is assured by the positive reception of card C within recess s as the same is withdrawn from the erstwhile adhering card indicated at C′, which latter may tend to travel with the other card but by the parting action will be slightly offset therefrom so that the card carried within the recess s of belt 45 will be uppermost so that its upper edge may be received between rollers 44,69 which are rotated at a relatively increased angular rate by reason of the differential in diameters of the gears 39,42 (see FIG. 7). Thus, the leading card will be rapidly pulled and further separated from the other card C′ for presentation to member 70 for ultimate travel along chute 71.

Thus, the present invention is designed to separate cards which are adapted to form a part of the operating circuitry of the structure to make certain that the appropriate indicators are actuated for the intended instructional purpose.

By the foregoing novel construction, there is obviated the possibility of two cards traveling simultaneously to the viewing position in which contingency the forward face 11 of one would be presented to the viewer with the rearward face of the other being exposed to the photoemissive source for causing an inaccurate and misleading circuit closing operation as above described.

It should be understood that changes and modifications in the formation, construction, and arrangement and combination of the several parts of the Card Feeder for Instructional Devices may be made and substituted for these herein shown and described without departing from the nature and principle of our invention.

Having thus described our invention, what we claim and desire to obtain by Letters Patent is:

1. In an instructional machine having a housing with a window provided therein for viewing therethrough the forward, intelligence-bearing face of a card, signal means, circuit means connected to said signal means, and a circuit determining pattern provided on the rear face of said card, the improvement comprising: means defining a reservoir for cards to be sequentially presented to the window; a driving conveyor belt provided in said housing; drive means mounted in said housing for effecting vertical travel of said driving conveyor belt; a plurality of spaced-apart ribs formed on one face of said driving conveyor belt; a driven conveyor belt provided in said housing in confronting relationship to the ribs of said driving conveyor belt for limiting the contactual engagement between said driving and driven conveyor belts; means for delivering a card from said reservoir to said driving conveyor belt for travel between the confronting portions of said driving and driven conveyor belts toward said window; the distance between said ribs being slightly greater than the dimension of the cards to be received therebetween; the height of said ribs being substantially the same as the corresponding dimension of the accommodated card; the coefficient of friction between the confronting faces of adjacent cards being less than the coefficient of friction between the face of the card and the related belt whereby in the event that two cards are fed between the confronting faces of the driving and driven belts, the belts will operate to separate the cards.

* * * * *